United States Patent Office 3,163,686
Patented Dec. 29, 1964

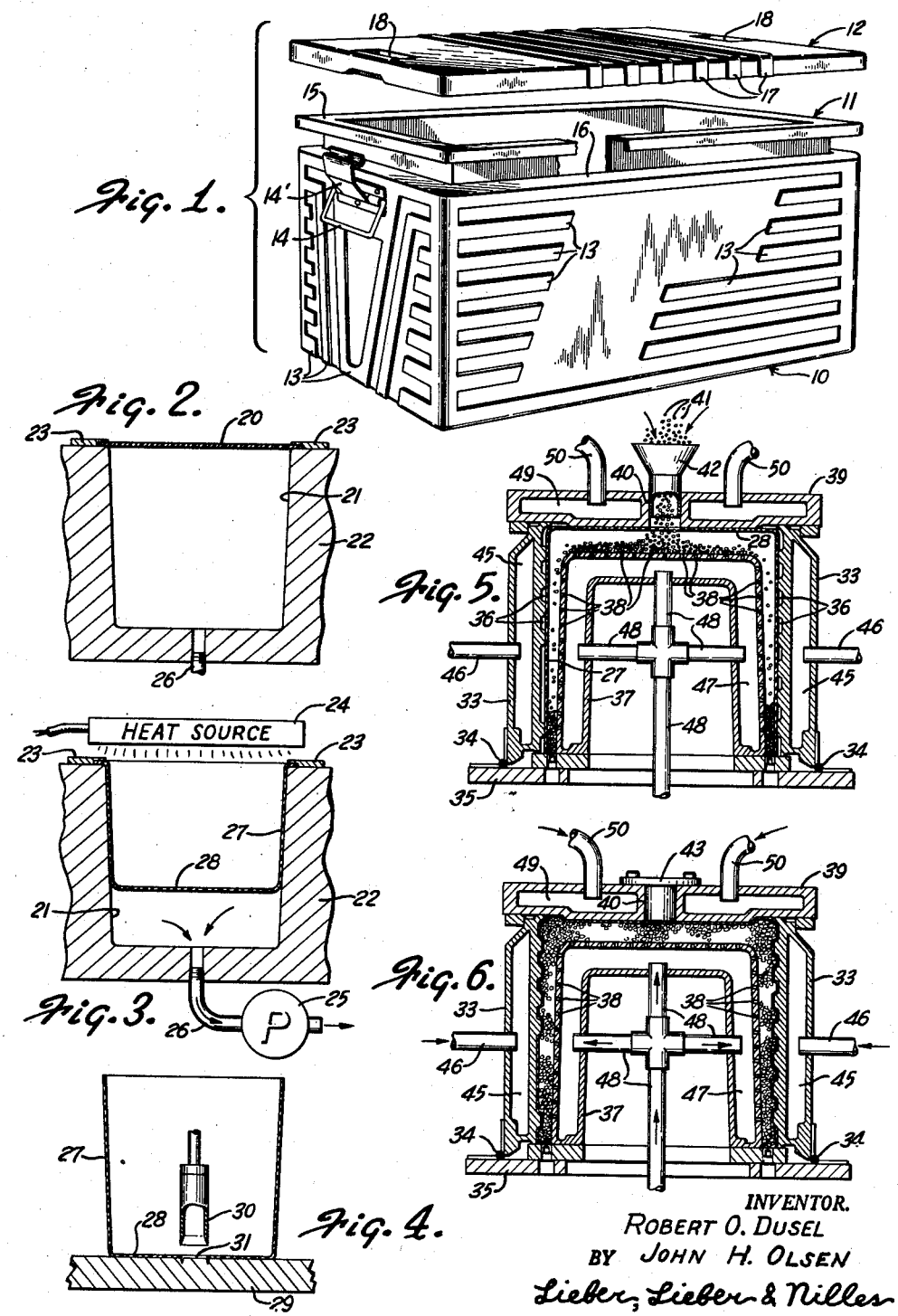

3,163,686
ART OF FORMING COMPOSITE PLASTIC
DEVICES
Robert O. Dusel, Brookfield, and John H. Olsen, Milwaukee, Wis., assignors to Pulp Reproduction Company, Milwaukee, Wis., a corporation of Wisconsin
Filed Apr. 2, 1962, Ser. No. 184,222
3 Claims. (Cl. 264—45)

The present invention relates generally to improvements in the field of plastics, and relates more particularly to the provision of an improved molded plastic article and the method of producing the same.

It is common practice to manufacture diverse articles such as, for example, portable picnic coolers, trays, boxes, buckets, various toys and the like of plastic materials. Many such articles are formed of a foamable material in granular or liquid form adapted to expand under the influence of heat. When introduced in proper amounts into a mold and then expanded, an integral cellular body of the desired shape results which is light in weight and extremely economical in cost.

However, the molded articles thus produced are relatively fragile and are susceptible to surface rupture and similar damage when bumped by or against hard objects. Moreover, the cellular nature of the resultant body presents an unattractive and unfinished appearance which creates an impression of cheapness to prospective purchasers requiring further treatment to make the same more saleable. Also, while the relatively pervious or porous characteristic qualities are advantageous for certain applications or usages, it is desirable in numerous instances to seal the exposed cells and impart a relatively smooth finish to exposed surfaces.

Accordingly, it has been heretofore proposed to cover exposed surfaces of the expanded cellular bodies with a film or films of plastic thus forming a laminated structure having an exposed outer surface or skin which is relatively dense, non-cellular and dent resistant. In some instances, the outer film is obtained by using skin forming particles which adhere to the surface and form a relatively continuous cover as shown in U.S. Patent No. 2,950,505, dated August 30, 1960, to Jacob Frank, U.S. Patent No. 2,954,589, dated October 4, 1960, to Winthrop L. Brown, and U.S. Patent No. 2,948,651, dated August 9, 1960, to Harry O. Waag. However, in such methods it is necessary to initially cover the surface of the mold cavity with a coating or layer of the skin forming material, usually in powder, granular or liquid form, and then introduce the expandable material into the coated mold and thereafter heat the same to expand the material and thus form the final article, the coating operation being rather tedious and time-consuming.

In still other instances, the outer covering is obtained by using thermoplastic sheeting in forming the skin, the sheeting in some cases being drawn into complete conformity with the mold in an initial operation with the internally covered mold cavity then being filled with a liquid foaming material as shown in U.S. Patent No. 2,753,642 dated July 10, 1956, to George C. Sullivan, and the sheeting in other cases merely being laid flat across the open end of the mold and being expanded completely by full expansion of initially unexpanded beads when subjected to heat as in U.S. Patent No. 2,977,639 dated April 4, 1961, to Raymond A. Barkhuff, Jr., et al. Again, both of these proposed methods are objectionable in that they are necessarily limited in use to the production of relatively shallow articles of more-or-less regular shape or configuration in which very little draw is required.

It is therefore a principal object of this invention to provide an improved method of and apparatus for economically producing laminated plastic articles of diverse shapes and sizes and having irregular surface contours and an integral and relatively impervious protective skin which obviates the disadvantages heretofore attendant prior production methods and apparatus.

Another object of the present invention is to provide a practical production method and apparatus for the manufacture of composite plastic articles having cellular bodies and a dense protective skin tightly and integrally adhered thereto over its entire exposed surface, the improvements being exceptionally flexible in their adaptations and use.

Still another object of the invention is to provide improvements in the art of producing molded plastic containers and similar articles having pre-designed surface irregularities for enhancing their appearance and formed with a continuous integral scuff-resistant skin.

These and other objects and advantages of the invention will become apparent from the following detailed description considered in conjunction with the accompanying drawing wherein:

FIG. 1 is an exploded perspective view of a typical picnic cooler produced in accordance with the invention, a portion of the inner liner being broken away to more clearly reveal the lip thereof;

FIG. 2 is a fragmentary transverse vertical section through a typical pre-forming mold with a skin-forming sheet of thermoplastic film secured in position for the performance of the initial step of the improved method;

FIG. 3 is a similar fragmentary section showing the step of partially pre-forming the thermoplastic sheet in the mold with the aid of heat and suction;

FIG. 4 is a fragmentary transverse vertical section illustrating the next step of the method wherein an entry hole for the heat-expandable body-forming material is cut from the bottom wall of the partially pre-formed thermoplastic sheet;

FIG. 5 is another transverse vertical section through a typical mold for finally forming the skin-covered article and showing the partially-pre-formed thermoplastic sheet inverted and positioned within the mold cavity with the expandable body-forming material being supplied thereto by way of the entrance hole in the sheet; and FIG. 6 is a similar transverse vertical section showing the mold cavity filled and sealed with heat being supplied thereto to expand the body-forming material and the thermoplastic outer sheet into complete conformity with the mold.

While the invention has been shown and described herein as being especially applicable to the production of containers such as picnic coolers with partially pre-expanded polystyrene beads being used for the body and polystyrene sheeting being used for the skin-forming outer covering, it should be understood that numerous other articles may be advantageously produced by the improved method and other expandable materials and thermoplastic sheeting may be substituted in the method. It is also contemplated that certain specific descriptive terminology used herein shall be given the broadest possible interpretation consistent with the disclosure.

A typical picnic cooler produced in accordance with the improved method and by means of the improved apparatus is shown in FIG. 1. The picnic cooler comprises, in general, a relatively deep body portion 10 having a separately formed inner liner 11 and provided with a cover 12. The box-like body 10 is formed of a heat expandable material such as beaded polystyrene expanded into a cellular core which is covered by an impervious external skin formed by a thermoplastic sheet material as will be hereinafter more fully described. The body 10 has an external embossed surface as illustrated at 13 to impart an attractive ornamental appearance, and the combined hinged handle and cover clamp 14, 14' is suitably secured to each end of the body 10 adjacent the upper open end thereof. The liner 11 is separately formed from a suitable impervious material and has an upper annular flange 15 which overlies the upper marginal edge or lip 16 of the body 10. The cover 12 is relatively shallow and may likewise be formed in accordance with the improved method hereinafter described. The cover may also be formed with embossed areas 17 over its outer surface, and recesses 18 are preferably provided in the cover adjacent the opposite ends thereof for reception of the adjacent clamp 14' carried by the box-like body 10.

The improved and novel method is illustrated in FIGS. 2 to 6 inclusive and comprises generally the following steps. First, a flat impervious thermoplastic sheet 20 adapted to be stretched under the influence of heat and pressure and compatible with the expandable material from which the core is to be formed is selected. The flat thermoplastic sheet 20 is placed over the relatively smooth walled cavity 21 of a mold 22 with the edge portions of the sheet being secured about the mold by means of suitable clamps 23 as shown in FIG. 2. Next, the thermoplastic sheet is subjected to heat as by means of a suitable electric heater 24 and a vacuum is drawn within the mold cavity by means of a vacuum or suction pump 25 communicating with the cavity through a conduit 26 as shown in FIG. 3. By means of the simultaneous application of heat and vacuum, the sheet 20 is thus pre-formed to the general outer contour of the body 10, the sheet assuming generally the shape of a receptacle having side and bottom walls 27, 28 respectively. With the aid of a suitable die 29 and circular knife 30, an aperture 31 is then formed in the bottom wall 28 to provide an entrance opening as will hereinafter more fully appear.

The thin walled receptacle thus formed from the thermoplastic sheet is then inverted and placed within the cavity of a mold formed by hollow side walls 33 hingedly secured as at 34 to a base 35, and the inner surfaces of the side walls 33 are provided with debossed or recessed areas 36 so that the mold has a contoured mold surface. The inner part 37 of the mold forming the male portion thereof is also hollow and is preferably formed with a plurality of perforations 38 in the wall thereof facing the mold cavity. The mold is furthermore provided with a cover 39 cooperating with the sides 33 to form the female half of the mold, the cover 39 likewise preferably being hollow and having a supply opening 40 therein corresponding and conforming to the aperture 31 formed in the bottom wall of the pre-formed thermoplastic receptacle so as to provide a passageway for introduction of a quantity of polystyrene beads 41 as shown in FIG. 5 wherein the polystyrene beads 41 are shown as being introduced into the mold with the aid of a funnel 42 or the like. After the cavity defined by the side and bottom walls 27, 28 of the pre-formed thermoplastic sheet and the perforated wall of the male half of the mold 37 has been substantially filled with heat expandable polystyrene beads, the entrance passage 40 in the cover 39 of the mold is covered by a closure 43 suitably clamped thereto. Heat is then conducted simultaneously to the hollow interiors 45 of the side walls 33 as by way of conduits 46, and also to the hollow interior 47 of the male portion 37 of the mold as by way of conduits 48 as well as to the hollow interior 49 of the cover 39 as by way of the conduits 50. Upon such application of heat to the parts of the mold defining the mold cavity, the beaded polystyrene expands into a cellular mass as defined by the shape of the mold cavity and the expanding core forces the walls of the thermoplastic sheet into snug conformity with the debossed contoured mold surface and the polystyrene core also becomes firmly bonded to the inner surface of the polystyrene sheet to provide the core with an external protective skin, the surface of the final article being surface embossed.

The skin forming outer covering may be selected from any thermoplastic sheet material which is compatible with and will seal to the heat expandable material used in the method. The thermoplastic sheet material should be of high density and may be of any desired thickness within a range which will permit the sheet to be drawn into the mold to assume a given shape and be relatively self-supporting in order to serve its purpose in defining a space within which the heat expandable beads may be introduced as shown in FIG. 5. The heat expandable material is preferably in the nature of a thermoplastic resin such as partially expanded polystyrene beads, and these beads are supplied to the mold cavity formed between the walls 27, 28 of the thermoplastic sheet and the perforated outer wall of the male part of the mold. It has been found that pre-expanded polystyrene beads having a density in the range of about 2 to 6 lbs. per cubic foot are epsecially suitable and give good results, but the degree of pre-expansion may be varied to provide the desired density in the core. Pre-expansion of polystyrene beads is, of course, known in the art and is generally carried out by heating a layer of the beads at approximately 200° F. for the time required to expand them to the desired density. The heat may be supplied to the hollow interiors of the mold in the form of steam, and the temperature employed is in the range of 260° to 280° F.

The articles thus produced may partake of various forms having desired embossed or raised surface characteristics, and the embossing may be complemented by the name of the producer or a prominent trademark. The final articles have a relatively porous cellular core which is protected interiorly by the self-supporting liner and which is exteriorly covered by the integral skin forming thermoplastic sheet of high density which is, in fact, quite skuff resistant. The method is especially suitable for use in producing articles requiring deep draw, and picnic coolers and similar products produced in accordance with the method have achieved a high degree of commercial success. It should, of course, be understood that a wide variety of articles may be formed by the present method, and various available heat expandable materials may be used in forming the core as long as the materials used for the core and for the skin are capable of being integrally united under the influence of heat.

Various modes of carrying out the invention are contemplated as being within the scope of the following claims particularly pointing out and distinctly claiming the subject matter which is regarded as the invention.

We claim:

1. The method of producing an article of considerable depth and provided with irregular surface design contours in which the body is formed of a heat expandable material having a thermoplastic protective covering sheet laminated to any covering the embossed surface to thus provide an integral coposite structure, which method comprises, initially pre-forming a flat impervious thermoplastic sheet by drawing it to the desired depth and general shape of the body by application of heat and vacuum, then forming an aperture in a wall of said initially pre-formed sheet to provide an entrance opening therein, placing the initially pre-formed sheet in a mold having an adjacent mold surface contoured to embody the irregularities to be imparted to the surface of the article, introducing a quantity of heat expandable material into the mold through the entrance opening formed in said initially pre-formed sheet, and finally subjecting the heat expandable material and the initially pre-formed sheet within the mold to heat to thereby expand said material and force said sheet into snug conformity with the contoured mold surface to thus provide the final composite surface embossed and protectively covered article.

2. The method of producing a receptacle of considerable depth and provided with irregular surface design contours in which the body is formed of a heat expandable cellular material having an impervious thermoplastic protective covering sheet laminated to and covering the embossed surface to thus provide an integral composite structure, which method comprises, initially pre-forming a flat impervious thermoplastic sheet by drawing it to the desired depth and general shape of the body by application of heat and vacuum to form a receptacle having side and bottom walls substantially devoid of surface irregularities, then forming an aperture in the bottom wall of said pre-formed receptacle to provide an entrance opening therein, placing the pre-formed receptacle in a mold having an adjacent mold surface contoured to embody the irregularities to be imparted to the surface of the final receptacle, introducing a quantity of heat expandable material into the mold through the entrance opening formed in the bottom wall of said pre-formed receptacle, and finally subjecting the heat expandable material and the pre-formed thermoplastic receptacle within the mold to heat to thereby expand said material and simultaneously force the walls of said receptacle into snug conformity with the contoured mold surface to thus provide the final composite surface embossed and protectively covered receptacle.

3. The method of producing a receptacle of considerable cellular plastic having an impervious thermoplastic contours in which the body is formed of a heat expandable cellular plastic having an impervious thermoplastic protective covering sheet laminated to and covering the embossed surface to thus provide an integral composite structure, which method comprises, initially pre-forming a flat impervious thermoplastic sheet to the general contour of the body by applying heat and simultaneously vacuum drawing the same into a smooth-surfaced mold to form a receptacle of the desired depth having side and bottom walls substantially devoid of surface irregularities, then forming an aperture in the bottom wall of said pre-formed receptacle to provide an entrance opening therein, inverting the receptacle and placing the same in a mold having an adjacent mold surface contoured to embody the irregularities to be imparted to the surface of the receptacle, introducing a quantity of heat expandable polystyrene beads into the mold through the entrance opening formed in the bottom wall of said pre-formed receptacle, and finally simultaneously subjecting both the polystyrene beads and the pre-formed thermoplastic receptacle within the mold to heat to thereby expand said beads and force the walls of said receptacle into snug conformity with the contoured mold surface while causing adherence of said beads to each other and to said thermoplastic sheet to thus provide the final composite surface embossed and protectively covered receptacle.

References Cited in the file of this patent
UNITED STATES PATENTS

| | | |
|---|---|---|
| 2,282,423 | Kopitke | May 12, 1942 |
| 2,753,642 | Sullivan | July 10, 1956 |
| 2,977,639 | Barkhuff et al. | Apr. 4, 1961 |
| 3,074,110 | Mard et al. | Jan. 22, 1963 |
| 3,091,946 | Kesling | June 4, 1963 |